United States Patent [19]
Sidur

[11] 3,740,180
[45] June 19, 1973

[54] CORE PIN FOR PLASTIC INJECTION BLOW MOLDING

[75] Inventor: Edmund Sidur, Livermore, Calif.

[73] Assignee: Package Machinery Company, East Longmeadow, Mass.

[22] Filed: Oct. 19, 1971

[21] Appl. No.: 190,540

[52] U.S. Cl.............................. 425/249, 425/451
[51] Int. Cl............................................. B29d 23/03
[58] Field of Search ................... 425/326 B, 387 B, 425/324 B, DIG. 58, 451, 342, 243, 249, 296, 297, 310; 249/79

[56] References Cited
UNITED STATES PATENTS
3,408,691  11/1968  Ruekberg............................ 425/249
3,339,231  9/1967  Piotrowski..................... 425/326 X FOREIGN PATENTS OR APPLICATIONS
1,036,779  7/1966  Great Britain..................... 425/326

Primary Examiner—J. Spencer Overholser
Assistant Examiner—Michael O. Sutton
Attorney—Roger B. McCormick

[57] ABSTRACT

A parison and core pin construction for a plastic injection blow molding machine of the type wherein a rotatable arm supports at least two such pins in diametrically opposed relationship and alternates them between a separable parison mold over the arm and a separable blow mold below the arm. The pins work in unison. That is, when plastic is injected in the parison mold on top of the pin associated with it, that pin thrusts upon and opens the pin opposed to it and in the blow mold to admit air under pressure to the parison in the said blow mold.

11 Claims, 7 Drawing Figures

CORE PIN FOR PLASTIC INJECTION BLOW MOLDING

BACKGROUND OF THE INVENTION

It is a common practice in plastic injection blow molding machines to provide an arm which is rotatable on its own center line or on an axis perpendicular thereto and which supports a plurality of parison and core pins in diametrically opposed rows and which is rotatable so that the pins in one row will be surrounded by a multi-cavity parison mold while the pins in the opposed row are surrounded by a multi-cavity blow mold. The arm is generally controlled so that the pins in the respective rows will be alternated between the positions associated with the parison mold and with the blow mold respectively. The parison and core pin utilized in such machines should be constructed and designed to admit no air under pressure to the cavity in the parison mold but to provide air under pressure to blow the parison in the cavity of the blow mold. Such pins should also be designed for rather close temperature control which is accomplished by the circulation of a heat exchange fluid within the pins, such fluid being utilized as needed to add or extract heat from the pins in the mod cavities.

In meeting these design parameters, the pin constructions provided have for the most part been quite complex and have not functioned entirely satisfactorily for all purposes.

SUMMARY OF THE INVENTION

In accordance with the present invention, there is provided a parison and core pin construction of relatively simple design and capable of substantially foolproof operation. The design provided embraces the use of a pin stem which is slidable within a retainer sleeve secured to the rotatable arm and which cooperates with the said sleeve and a shell secured to its outer projecting portion to provide for the passage of air for blowing parisons and to provide for the passage of the heat exchange fluid for controlling the pin temperature. Each such pin stem is axially slidable in a bore provided within the rotatable arm and each such pin can thrust upon and thus move the opposed counterpart pin stem. With this arrangement, there is provided a composite pin construction wherein the pressure of the plastic melt being injected into the parison mold shifts the associated pin so that it will in turn shift the opposed pin to open it for the flow of blow air into the blow mold.

This and other features of construction will become more apparent in the specification which follows with reference to the accompanying drawings.

DETAILED DESCRIPTION OF THE PREFERRED EMBODIMENT

Figures 1, 2:
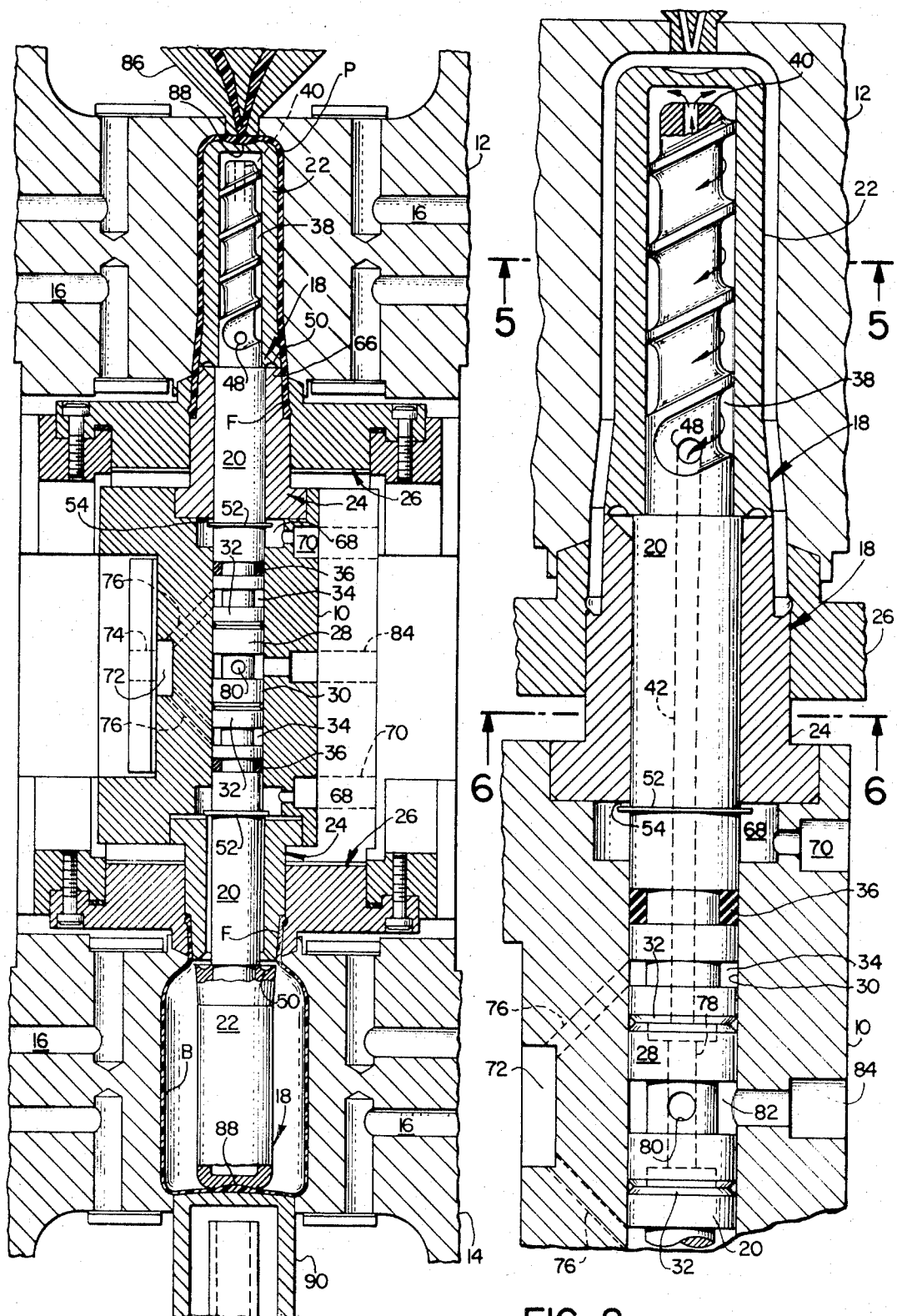
FIG. 1 is a transverse cross-sectional view taken through a parison pin support arm so as to provide a longitudinal cross-sectional view through the opposed but identical parison and core pins.
FIG. 2 is a view similar to FIG. 1 but on an enlarged scale showing the upper portion of FIG. 1.
Figure 5:
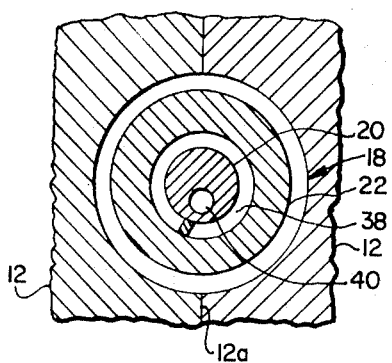
FIG. 5 is a transverse cross-sectional view through the parison pin shown in the upper position in FIGS. 1 and 2, the plane of the cross-section being taken as indicated by the line 5—5 of FIG. 2.
Figure 6:
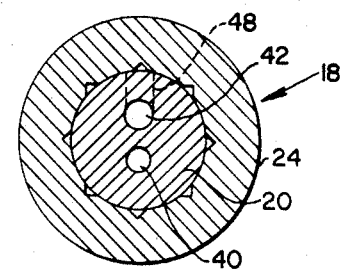
FIG. 6 is a further cross-sectional view taken as indicated by the line 6—6 of FIG. 2.

In the various views of the drawings, the parison pin support arm is indicated by the reference number 10, and as shown in FIG. 1, it is located substantially midway between the separable parts 12 of an upper parison mold and between the separable parts 14 of a lower blow mold. Both such molds are generally made in two parts which engage each other in a vertical plane (such as indicated by the line 12a) to define their respective parison and blow mold cavities therebetween. The mold parts 12 and 14 are quite conventional, and they both include passages such as indicated at 16, 16 for the circulation of a heat exchange fluid, generally a cooling fluid, to maintain a desired mold temperature.

A pin support arm 10 which is shown in transverse cross-section in FIG. 1 in some machines may be rotatable or pivotable about its longitudinal center line (thus on an axis perpendicular to the plane of the drawing) or it may rotate or pivot about its transverse center line (which extends horizontally from left to right in the plane of the paper). In either event, it supports at least one pair of opposed parison and core pins each of which is indicated generally by the reference number 18. These core pins are identical and are shown to be in opposed relationship to each other or in diametrically opposed relationship to each other with respect to the arm 10. Therefore, the upper core pin or parison pin 18 is associated with the parison mold 12 for injecting the parison within its cavity while the lower and opposed pin 18 is associated with the mold 14 for blowing a previously formed parison into the final shape of the plastic article to be formed in the cavity of the said blow mold. Since the pin constructions 18 are identical, a description of one will serve as a description for the other.

Each parison pin or core pin 18 includes among its principle elements a stem 20, a closed end or cup-shaped shell 22, and a retainer sleeve 24. A multi-part neck ring 26 is also associated with each pin 18, and a single pin spacer 28 is associated with both of the opposed and shown pins 18 by being located in the bore 30 which receives the inner ends 32, 32 of the respective pin stems 20, 20, the said inner ends of the stems being engaged with the opposite ends of the pin spacer or separator.

Figure 7:
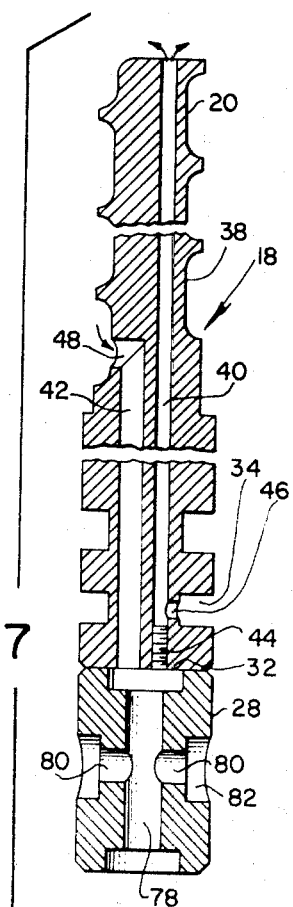
FIG. 7 is a longitudinal cross-sectional view taken through a parison pin stem and the spacer which separates such stem from its opposed counterpart in another parison pin.

Each stem 20 has an annular groove 34 near to but spaced from its inner end 32 and another annular groove spaced outwardly from the groove 34 to receive an O-ring seal 36 within the arm bore 30. Each stem is also provided with a spiral or helical flute 38 along its outwardly projecting portion which is received within the pin shell 22. In addition, and as best shown in FIG. 7, each stem 20 is provided with a pair of axially extending drilled passageways 40 and 42, the passage 40 extending from the outer end of the stem to the inner end of the stem, and the passage 42 extending from the inner end of the stem to a location adjacent the inner convolution of the flute 38. The inner end of the passage 40 is closed by a plug 44, and a radial port 46 extends from the annular groove 34 into the inner end portion of the drilled passage 40. A radial port 48 extends from the flute 38 into the outer end of the drilled passage 42.

In the construction or assembly of the pin 18, the closed end or cup-shaped shell 22 is shrink fitted onto the projecting end portion of the stem 20 which is provided with the helical flute 38, the closed end of the shell 22 being spaced from the outer end of the stem. Thus, the shell 22 is adapted to move with the stem 20 and the inner end of the shell provides an inwardly facing annular shoulder for the combined stem and shell, an annular groove 50 being defined on said inner end of the shell or shoulder for a purpose which will be described later. The pin and shell sub-assembly is associated with the retainer sleeve 24 by thrusting the inner end portion into the bore of the sleeve and by securing a snap ring 52 in a suitable groove provided on the stem 20 at the inner end of the said sleeve. As seen in FIG. 1, the snap ring is located on the stem 20 to provide spacing 54 between itself and the inner end of the retainer sleeve when the stem 20 to which it is mounted has been thrust inwardly to engage the pin spacer 28 and to thrust the opposed pin stem 20 outwardly until its snap ring 52 engages the inner end of its associated retainer sleeve 24. The spacing or distance 54 is of the order of 0.040 inches in the presently preferred embodiment of the pin construction.

Figure 4:
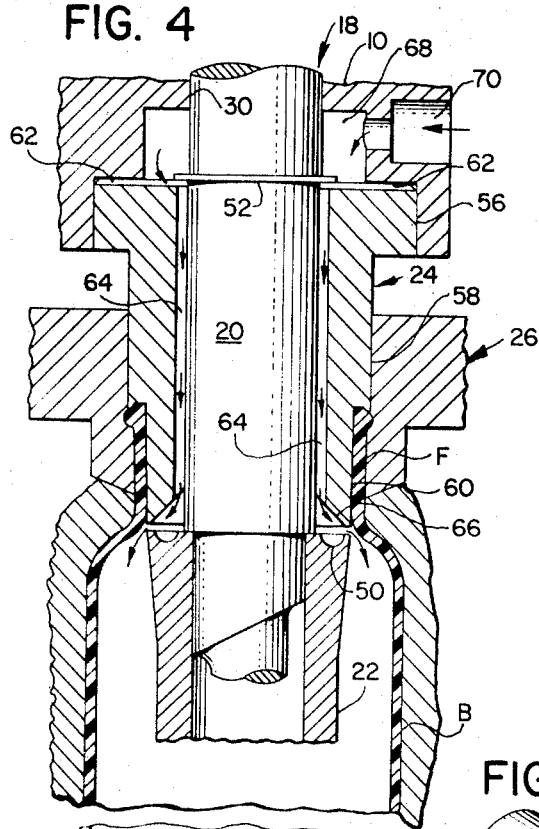
FIG. 4 is an enlarged cross-sectional view similar to FIG. 1 but showing the lower portion of that which is disclosed in FIG. 1.
Figure 3:
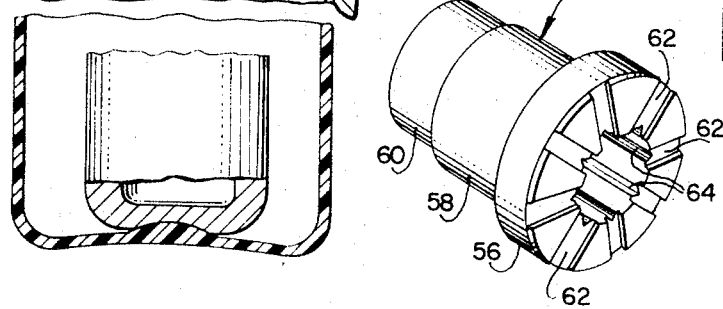
FIG. 3 is a perspective view of a retainer sleeve utilized in the pin construction of the present invention.

The retainer sleeve 24 which is shown in most detail in FIGS. 3 and 4 is generally cylindrical but has a stepped outside diameter. The inner end portion 56 of the retainer sleeve is of the greatest diameter and it is this inner end portion which is received in the arm 10 and secured therein. A reduced diameter intermediate portion 58 of the retainer sleeve 24 is surrounded and engaged by the neck ring 26. A still further reduced diameter outer end portion 60 on the retainer sleeve 24 cooperates with the surrounding neck ring 26 to define the neck and finish portion F of a parison P formed in the parison mold 12 and the neck and finish portion of a finally blown or shaped article B in the blow mold 14.

The retainer sleeve 24 is further constructed by being provided with a circumferential series of radially directed channels 62, 62 in its inner end and which communicate respectively with longitudinal or axially directed channels 64, 64 provided in the wall of its bore. The outer ends of the bore channels 64, 64 open into an annular chamfer or counter bore 66 at the outer end of the retainer sleeve 24, the said chamfer cooperating with the annular groove 50 in the inner end of the associated shell 22 to define an annular chamber around the stem 20 when the shell and retainer sleeve are engaged.

The channels or passages 62 and 64 are provided for the flow of air from a pressurized source to the interior of each parison or core pin 18. More specifically, an annular chamber 68 is defined in the arm 10 around each stem 20 at the inner end of the associated retainer sleeve 24 and each such chamber 68 is connected by means of a radial port 70 with a suitable control valve which selectively connects the chamber with a source of air under pressure or which vents the chamber to the atmosphere. Thus, when air under pressure is introduced through the port 70 into the annular chamber 68 in the arm 10 it will flow through the radial channels 62 and the longitudinal bore channels 64 in the retainer sleeve 24 to the outer end thereof and into the annular chamber defined by the chamfer 66 on the sleeve and the annular groove 50 on the inner end of the shell 22.

When a pin 18 is located in the blow mold 14 and its stem 20 is thrust downwardly as will be described, the shell 22 is moved away from the outer end of the retainer sleeve 24 to provide a gap for the flow of air into the parison. As shown in FIG. 4 and in the lower end portion of FIG. 1, this flow of air under pressure blows the previously formed parison into the wall of the blow mold to provide the final shape of the blown article B. Some of the air being blown downwardly in the channels 64 will be deflected upwardly by the groove 50 toward the neck portion of article B being blown. It has been found that this aids releasing the finished article from the mold after it has been blown. When the air flow control valve is positioned to disconnect the port 70 from the source of air under pressure and to open it to atmosphere, the air under pressure within the article B will be vented to atmosphere by reverse flow through the channels 64, 62 and the chamber 68.

In addition to providing for the flow of air through each parison pin 18, each such pin is adapted to accommodate the flow of a heat exchange fluid (which will hereinafter be referred to as "oil") for the purpose of maintaining a desired temperature at the surface of the pin shells 22 when in the parison mold 12 and the blow mold 14. More specifically, the arm 10 is provided with a centrally located manifold 72 which is connectible as by a port 74 with a pressurized source of such heat exchange fluid or oil. Two passages 76, 76 or conduits in the arm 10 interconnect its manifold 72 with the annular grooves 34, 34 of the opposed pins 18, 18. Thus, we see the purpose for the O-ring seal 36 in the annular groove spaced outwardly from the annular groove 34, this purpose being to prevent the intermingling of the flow of oil and air in the arm bore 30.

The pressurized oil which enters the groove 34 flows through the port 46 (FIG. 7) and then outwardly through the drilled passage 40 in the stem 20 and through the outer end thereof which is spaced from the closed end of the associated shell 22. Then, the heat exchange fluid or oil flows through the spiral convolutions of the flute 38 inwardly of the pin stem 20 within the shell 22 until it enters the port 48 at the outer end of the drilled passage 42 (FIG. 7). The oil flows through the passage 42 through the inner end of the pin stem 20 and into a longitudinal bore 78 provided in the pin spacer 28. The oil then flows out of the bore 78 through radial ports 80, 80 (FIG. 7) into an annular groove 82 in the outer surface of the spacer 28 and this annular groove is connected by mans of a radial port 84 (FIGS. 1 and 2) to a reservoir where it can be recirculated as the source of pressurized heat exchange fluid.

While in the presently preferred form the heat exchange fluid is introduced through the manifold 72 in the arm 10 and discharged through the port 84 in the arm 10, the direction of flow can be reversed from the port 84 to the manifold 72.

The operation of the core pins provided in accordance with this invention can be best understood by reference to FIG. 1 wherein the upper core pin 18 is shown enclosed within the parison mold 12 and the lower core pin 18 is shown enclosed within the blow mold 14.

The parts of the upper or parison mold 12 when engaged close upon the end of a nozzle element 86 of the injection molding machine, the discharge end of said nozzle being spaced outwardly from the outer or closed end of the pin shell 22 which is enclosed within the parison mold 12. It will be observed that the surface of the closed end of the shell 22 is provided with a depression 88 against which the plastic melt is injected so as to direct the flow of the melt into the parison mold cavity and thus to form the plastic parison P.

The force of the flow of the plastic melt from the nozzle 86, the injection pressure, thrusting upon the outer end of the shell 22 thrusts it and its associated stem 20 downwardly or radially inwardly so that the shell 22 seats upon the outer end of the associated retainer sleeve 24. The thrust of the upper stem 20 against the spacer 28 causes the stem 20 of the lower pin 18 to be thrust downwardly or radially outwardly, thus moving its associated shell 22 away from engagement with the outer end of its associated retainer sleeve 24. As previously mentioned, the gap provided between the lower shell and retainer sleeve within the blow mold 14 permits the flow of air under pressure into the previously formed parison on the lower shell 22 so that it will be blown to the final shape of the finished article B.

At this point, it is to be explained that the conventional valving for the flow of air under pressure to the parison pins and for venting air from the parison pins is preferably timer controlled. That is, the timer operates to control such valving to introduce air under pressure to the pin in the blow mold 14 for a selected interval of time sufficient to blow the parison to the final shape of the article B. Then, the timer opens the valving for vent purposes so that any air within the finished article in the blow mold can be vented to atmosphere. Each arm passage 70 will remain vented while its associated pin returns to the lower position for blowing of a second parison. When such pin returns to the upper position and is again subjected to the injection pressure its shell 22 will engage its retainer sleeve 24 and will open the air gap in the opposed pin now in the lower position in the blow mold 14.

After a parison P has been formed on the upper pin 18 and a final article shaped on the lower pin 18, the molds 12 and 14 will open and the arm 10 will be rotated or pivoted so that the pin carrying the parison from the upper mold 12 will be positioned for engagement by the lower or blow mold 14. The neck ring 26 will remain closed on the pin carrying the parison from the upper mold to the lower mold, but the neck ring 26 will be opened after the lower mold 14 is opened so that the finished article B can be removed from the retainer sleeve 24. This removal can be effected by a puff of air introduced between the retainer sleeve 24 and the pin shell 22 under control of the air valving.

When a parison is carried on a pin 18 from the upper mold 12 to the lower mold 14, a bottom plate 90 is moved upwardly into close proximity with the bottom or closed end of the shell 22 and the parison P thereon. The depression 88 in the closed end of the shell serves to center the parison on the bottom plate 90 and helps control the wall thickness of the finally blown plastic article B.

The parts of the blow mold 14 are closed about the outer end of the lower neck ring 16 and about the bottom plate 90 to engage each other and to define the cavity within the blow mold in the final desired shape of the plastic article B. When a new parison has been formed above, and the previously formed parison has been finally formed below, the parts of the blow mold 14 are separated and the bottom plate 90 is lowered to accommodate separation of the parts of the lower neck ring 26 and removal of the finished article.

I claim:

1. A parison and core pin for a plastic injection blow molding machine of the type having a pin support arm adapted to carry two such pins on a common axis but projecting in opposite directions so that a parison forming mold can surround one pin while a blow mold surrounds the opposite pin, the said arm having a bore on the said common axis, the two supported pins each including a pin stem projecting outwardly from the bore, and each such pin also including a retainer sleeve secured to the arm on the said axis and receiving the stem for limited axial sliding movement in its bore and in the arm bore, a closed end shell surrounding that portion of the stem projecting outwardly from the retainer sleeve and being movable with the stem in one direction along the common axis to engage the outer end of the retainer sleeve and in the opposite direction to be spaced from the retainer sleeve, the distance separating the inner ends of the shells on the opposed stems being greater than the distance separating the outer ends of the retainer sleeves, and each shell being of such size as to cooperate with the parison mold and with the blow mold, respectively, to define the parison and blow cavities therewithin, the parison mold being adapted when surrounding the shell to provide for injection of a plastic melt against the closed end of the shell and the blow mold being adapted when surrounding the shell to provide a plate in closely spaced relationship to the closed end of the shell, and each pin being connectible with a source of air under pressure and being adapted to provide such air under pressure in the area of engagement between its shell and sleeve, whereby when one such pin is subjected to the plastic injection pressure in the parison mold its stem is moved axially inwardly in the arm bore to thrust the stem of the opposite pin outwardly in the arm bore and thus to cause its shell to be spaced from its retainer sleeve and to admit air under pressure to blow the parison into final shape in the blow mold.

2. The pin construction of claim 1 wherein the said arm is rotatable so as to alternate the two such pins in association with the parison and blow molds, and a spacer is slidably disposed in the arm bore in engagement with the inner ends of the two pin stems.

3. The parison and core pin construction of claim 1 wherein each pin stem is connectible with a pressurized source of a heat exchange fluid and is provided with circulating passages for such fluid to direct it through the cavity of its associated shell.

4. The pin as defined in claim 2 wherein each pin stem is connectible with a pressurized source of a heat exchange fluid and each stem and the spacer are provided with interconnecting circulating passages for such fluid to direct it through the cavity of the shell associated with each stem.

5. The pin of claim 4 wherein the said passages in each stem include helical flutes formed externally on the stem within its associated shell.

6. A parison and core pin construction as defined in claim 1 wherein the said arm is rotatable so as to alternate the two said pins in association with the parison and blow molds, and a separable neck ring is associated with each pin, the parts of each such neck ring being adapted to surround the outer projecting portion of the associated retainer sleeve to define therewith the neck and finish portion of the parison and finally blown plastic article, and the parts of each such neck ring also being adapted to cooperate with the parison and blow molds in defining their respective cavities.

7. The pin construction of claim 1 wherein the pressurized air is directed to the area of engagement of the shell and sleeve in each pin by providing an annular chamber in the arm adjacent the inner end of each sleeve and connecting it with the source of air, and by providing the wall of the sleeve bore and the inner end of the sleeve with interconnecting channels.

8. The construction defined in claimed 7 wherein means is provided for venting each said annular chamber after air under pressure has been blown into the parison on its associated pin in the blow mold.

9. The construction of claim 4 wherein the pressurized air is directed to the area of engagement of the shell and sleeve in each pin by providing an annular chamber in the arm adjacent the inner end of each sleeve and connecting it with the source of air, and by providing the wall of the sleeve bore and the inner end of the sleeve with interconnecting channels.

10. The combination in claim 9 wherein means is provided for venting each said annular chamber after air under pressure has been blown into the parison on its associated pin in the blow mold.

11. The parison and core pin construction as defined in claim 10 wherein a separable neck ring is associated with each pin, the parts of each such neck ring being adapted to surround the outer projecting portion of the associated retainer sleeve to define therewith the neck and finish portion of the parison and finally blown plastic article, and the parts of each such neck ring also being adapted to cooperate with the parison and blow molds in defining their respective cavities.

* * * * *